(12) United States Patent
Matthews

(10) Patent No.: US 11,880,279 B2
(45) Date of Patent: Jan. 23, 2024

(54) METHODS AND SYSTEMS FOR RECREATING A PROGRAM STATE

(71) Applicant: Retrace Software Limited, Winchester Hampshire (GB)

(72) Inventor: Nathan Raymond Matthews, Beckenham Greater London (GB)

(73) Assignee: RETRACE SOFTWARE LIMITED, Winchester (GB)

( * ) Notice: Subject to any disclaimer, the term of this patent is extended or adjusted under 35 U.S.C. 154(b) by 0 days.

(21) Appl. No.: 17/794,878

(22) PCT Filed: Jan. 28, 2021

(86) PCT No.: PCT/GB2021/050196
§ 371 (c)(1),
(2) Date: Jul. 22, 2022

(87) PCT Pub. No.: WO2021/152312
PCT Pub. Date: Aug. 5, 2021

(65) Prior Publication Data
US 2023/0080595 A1    Mar. 16, 2023

(30) Foreign Application Priority Data
Jan. 30, 2020   (GB) .................................. 2001309

(51) Int. Cl.
*G06F 11/00* (2006.01)
*G06F 11/14* (2006.01)

(52) U.S. Cl.
CPC ...... *G06F 11/1446* (2013.01); *G06F 2201/84* (2013.01)

(58) Field of Classification Search
CPC .......................... G06F 11/1446; G06F 2201/84
See application file for complete search history.

(56) References Cited

U.S. PATENT DOCUMENTS 8,078,910 B1 *  12/2011  Backensto .......... G06F 11/1451
                                                          714/15
8,521,973 B2 *  8/2013   Rowan ................ G06F 11/0727
                                                          711/161
(Continued)

FOREIGN PATENT DOCUMENTS

EP           3093768 A2    11/2016

OTHER PUBLICATIONS

International Patent Application No. PCT/GB2021/050196, International Preliminary Report on Patentability (Chapter I) dated Jul. 28, 2022, 12 pages.

(Continued)

*Primary Examiner* — Joshua P Lottich
(74) *Attorney, Agent, or Firm* — FREDRIKSON & BYRON, P.A.

(57) ABSTRACT

There is provided a computer implemented method, a system for performing the method, and a computer program for recreating a program state. In one aspect, the invention comprises associating a step counter with respective points in the progress of a program's execution and generating a snapshot by storing the set of program values associated with a first step counter value. The state of the program is subsequently recreated by recreating the program state from the snapshot preceding the point in the progress of the program execution associated with a query step counter value and executing the program from the recreated state of the program to the point in the progress of the program execution associated with the second index reference value, including using previously stored non-deterministic values.

13 Claims, 7 Drawing Sheets

(56) References Cited

U.S. PATENT DOCUMENTS

| | | | |
|---|---|---|---|
| 9,122,765 B1* | 9/2015 | Chen | G06F 16/972 |
| 10,761,941 B1* | 9/2020 | Redko | G06F 11/1451 |
| 11,144,233 B1* | 10/2021 | Singhal | G06F 3/0619 |
| 11,625,307 B1* | 4/2023 | Havemose | G06F 11/1471 |
| | | | 714/15 |
| 2006/0259822 A1 | 11/2006 | Swoboda | |
| 2008/0046699 A1* | 2/2008 | Pauw | G06F 11/3664 |
| | | | 712/227 |
| 2011/0138385 A1 | 6/2011 | Schmelter et al. | |
| 2015/0052162 A1* | 2/2015 | Arnold | G06F 16/21 |
| | | | 707/756 |
| 2016/0154726 A1 | 6/2016 | Guan et al. | |
| 2016/0292061 A1 | 10/2016 | Marron et al. | |
| 2016/0335167 A1 | 11/2016 | Rosen | |
| 2016/0335172 A1* | 11/2016 | Smith | G06F 11/3644 |
| 2018/0032423 A1* | 2/2018 | Bull | G06F 11/3664 |
| 2018/0165176 A1 | 6/2018 | Chow et al. | |
| 2018/0173612 A1* | 6/2018 | Law | G06F 11/3636 |
| 2018/0260302 A1 | 9/2018 | Mola et al. | |
| 2019/0065323 A1* | 2/2019 | Dhamdhere | G06F 11/1484 |
| 2019/0188098 A1* | 6/2019 | Gupta | G06F 11/1446 |
| 2021/0103499 A1* | 4/2021 | Alluboyina | G06F 3/067 |
| 2021/0109757 A1* | 4/2021 | Price | G06F 9/45558 |

OTHER PUBLICATIONS

GB Patent Application No. 2001309.0, Examination Report under Section 18(3), dated Sep. 15, 2022, 5 pages.

International Patent Application No. PCT/GB2021/050196, International Search Report and Written Opinion dated May 7, 2021, 15 pages.

GB Patent Application No. 2001309.0, Combined Search and Examination Report under Sections 17 & 18(3), dated Nov. 18, 2020, 5 pages.

* cited by examiner

| Step Counter | Operation | Set Object after operation |
|---|---|---|
| 4.01<br>1001 | 4.02<br>Create Set | 4.03<br>Creation Counter: 1001<br>Update Counter: 1001<br>Set Content: {} |
| 4.04<br>1100 | 4.05<br>Add Element 'A' | 4.06<br>Creation Counter: 1001<br>Update Counter: 1100<br>Set Content: {'A'} |
| 4.07<br>1200 | 4.08<br>Add Element 'B' | 4.09<br>Creation Counter: 1001<br>Update Counter: 1200<br>Set Content: {'A', 'B'} |
| 4.10<br>1300 | 4.11<br>Add Element 'C' | 4.12<br>Creation Counter: 1001<br>Update Counter: 1300<br>Set Content: {'A', 'B', 'C'} |
| 4.13<br>1400 | 4.14<br>Remove Element 'B' | 4.15<br>Creation Counter: 1001<br>Update Counter: 1400<br>Set Content: {'A', 'C'} |

Figure 4

METHODS AND SYSTEMS FOR RECREATING A PROGRAM STATE

RELATED APPLICATIONS

This application is a 35 U.S.C. 371 national phase filing from International Application No. PCT/GB2021/050196, filed Jan. 28, 2021, which claims priority to GB Application No. 2001309.0, filed Jan. 30, 2020, the teachings of which are incorporated herein by reference.

FIELD OF INVENTION

This invention relates to a computer implemented method, a system for performing the method, and a computer program, whereby the exact provenance of any computed or retrieved value in the execution of an entire program can be determined.

BACKGROUND

Computer systems execute 'programs' that perform calculations to provide answers to the users of the system. A program takes input data and a sequence of instructions and generates a result. The sequence of instructions may contain many different expression types including: conditional expressions, looping constructs and function calls, a "call" being the process of executing a function in a program.

In the context of this description, a program is a sequence of instructions which when executed with data perform some work. The program may exist as source, or partially compiled (e.g. bytecode).

Given a result and program, it is non-trivial to determine how a program arrived at that result. Computer programs perform calculations on their inputs to generate a result. Computer programs are designed to run forwards, but understanding how a result was generated requires going backwards. This is not always straightforward. For example, consider the following expression:

$$A=B+C$$

If it is known that the value of A is 10, that knowledge doesn't give any indication as to the values of B and C. When the program executes, B and C must be known in order to compute A, but typically programming systems do not retain the values of intermediate variables once they're no longer used. Instead, they are thrown away to free up precious computer resources.

Understanding how a program arrived at a result is termed 'provenance'. This knowledge is important in many scenarios, for example: debugging the program, explaining a result, tracing sensitive data, financial compliance and explainability.

In known approaches, programmers often insert log statements into the program to help explain how a program execution (i.e. the process of evaluating a program) arrived at its result and the decisions a program execution took. When a log statement in a program is executed, a log message is appended to a log file. The consumer of log data is ultimately a human. The disadvantage of log statements is that, while providing a trace of program activity, they rely on programmer discipline to add them to the code. Logging may often be incomplete in a program, and it will only capture a subset of program activity. Additionally logging is costly in terms of developer resource and requires active maintenance as the program changes. Lastly logging does not provide the capability to rewind the program and re-create a past state.

Event sourcing is a technique which overcomes some of the deficiencies in logging. Program outputs and inputs are recorded as structured events. These events can be later replayed to re-create a previous program state. However as with logging, event sourcing requires active programmer participation to actively record all events.

Temporal databases which allow the user to query data as-of a point in time have existed for many years. Databases store data at rest, but do not encode how data itself was generated. The method of the claimed invention differs from temporal databases in this important regard.

SUMMARY OF INVENTION

The invention is defined by the independent claims. Preferred features are laid out in the dependent claims.

According to a first aspect of the invention, a computer implemented method comprises the steps of: associating respective index reference values with respective points in the progress of a program's execution; for program values computed or used by the program during a first execution of the program, assigning the index reference value associated with the point in the progress of the program execution at which the value was computed or used; generating a first program snapshot by storing the set of program values associated with a first of the index reference values; subsequently recreating a state of the program by: receiving an indication of a second of the index reference values; recreating the state of the program according to the values associated with the first index reference value, the first index reference value being associated with a point in the progress of the program execution that precedes the point in the progress of the program execution associated with the second index reference value; and executing the program from the recreated state of the program to the point in the progress of the program execution associated with the second index reference value, including using previously stored non-deterministic values determined by an evaluator program that evaluates the program during the first execution and determines and stores non-deterministic values.

It will be appreciated that the respective index reference values correspond to the step counters described herein.

The method allows the recreation of an earlier state of a program in its execution history The method may be used in methods for determining provenance of a program, such as value level provenance.

The method may be performed by one or more programs, such as a first evaluator program. The evaluator program that evaluates the program during the first execution and determines and stores non-deterministic values may be a separate second program different to the program performing the claimed method.

The subsequent claimed steps of recreating a state of the program may be implemented separately to the indexing steps using one or more separate programs. Embodiments may therefore implement the steps associated with subsequently recreating a state of the program based upon program snapshots previously, and separately, generated.

Respective points in the progress of a program's execution may be implemented in various ways. The counter generally correlates with execution time of the program and increases with time as the program executes. A step counter is used in the examples of preferred embodiments.

The snapshot allows for recreation of the program state at the corresponding index reference value with which it is associated.

Executing the program from the recreated state associated with the snapshot to the point in the progress of the program execution associated with the second of the index reference values allows a program state of a particular index reference value to be recreated without needing to store the values associated with the states of each index reference value. In order to allow the exact state to be recreated, instead only the non-deterministic values generated or used subsequent to the snapshot need to be received. These are provided by an existing function, such as a replay function, that evaluates the program as it executes and logs such non-deterministic values.

Non-deterministic values may include the current time, data read from an external database; and data retrieved via a network for example.

An embodiment of the invention further comprises the step of, for program values computed or used by the program during a first execution of the program, assigning the index reference value associated with the point in the progress of the program execution at which the value was created as a first counter.

It will be appreciated that the first counter corresponds to the creation counters described herein.

An embodiment of the invention further comprises the step of, for program values computed or used by the program during a first execution of the program, assigning the index reference value associated with the point in the progress of the program execution at which the value was modified as a second counter.

It will be appreciated that the second counter corresponds to the update counters described herein.

An embodiment of the invention further comprises the step of, for program values computed or used by the program during a first execution of the program, assigning the index reference value associated with the point in the progress of the program execution at which the value was inserted into a program object as a third counter.

It will be appreciated that the third counter corresponds to the insertion counters described herein.

In another embodiment of the invention, one or more stack frames are generated by the program during execution, the method further comprising the step of, for each program stack frame generated by the program during execution, assigning the index reference value associated with the point in the progress of the program execution at which a value is assigned to the program stack frame.

It will be appreciated that the respective index reference values associated with the point in the progress of the program execution at which a value is assigned to the program stack frame correspond to the stack counters described herein.

The program stack frame may comprise local memory that stores parameters and variables required for the program to execute one or more functions.

An embodiment of the invention further comprises generating further program snapshots by storing the set of program values associated with further index reference values.

An embodiment of the invention further comprises the step of, once the first program snapshot is generated, deleting the stored non-deterministic values required to recreate the state of the program to the point in the progress of the program execution corresponding to the first program snapshot.

In another embodiment of the invention, the method is performed by one or more first evaluator programs and wherein the evaluator program that evaluates the program during the first execution and determines and stores non-deterministic values is executed independently of the one or more first evaluator programs.

By executing the replay function independently it can be decoupled from the "retrace", or secondary, evaluator described herein. This has various benefits as described herein.

In another embodiment of the invention, the second evaluator program logs each non-deterministic value that is computed or used by each non-deterministic call made by the program during execution.

It will be appreciated that the replay function described herein corresponds to logging each non-deterministic value that is computed or used by each non-deterministic call made by the program during execution.

In another embodiment of the invention, a plurality of program operations are each associated with the same index reference value.

In another embodiment of the invention, the program values are associated with program objects.

The program values may be associated with respective program objects.

In a second aspect of the invention, a system is configured to carry out the method of the first aspect of the invention.

In a third aspect of the invention, a computer program that when executed on one or more processors causes said processors to carry out the method of the first aspect of the invention.

DETAILED DESCRIPTION

Embodiments will now be described by way of example only and with reference to the accompanying drawings, in which:

FIG. 4 shows a schematic diagram of how step counters can be used as an update counter when modifying a program object;

Figure 1:
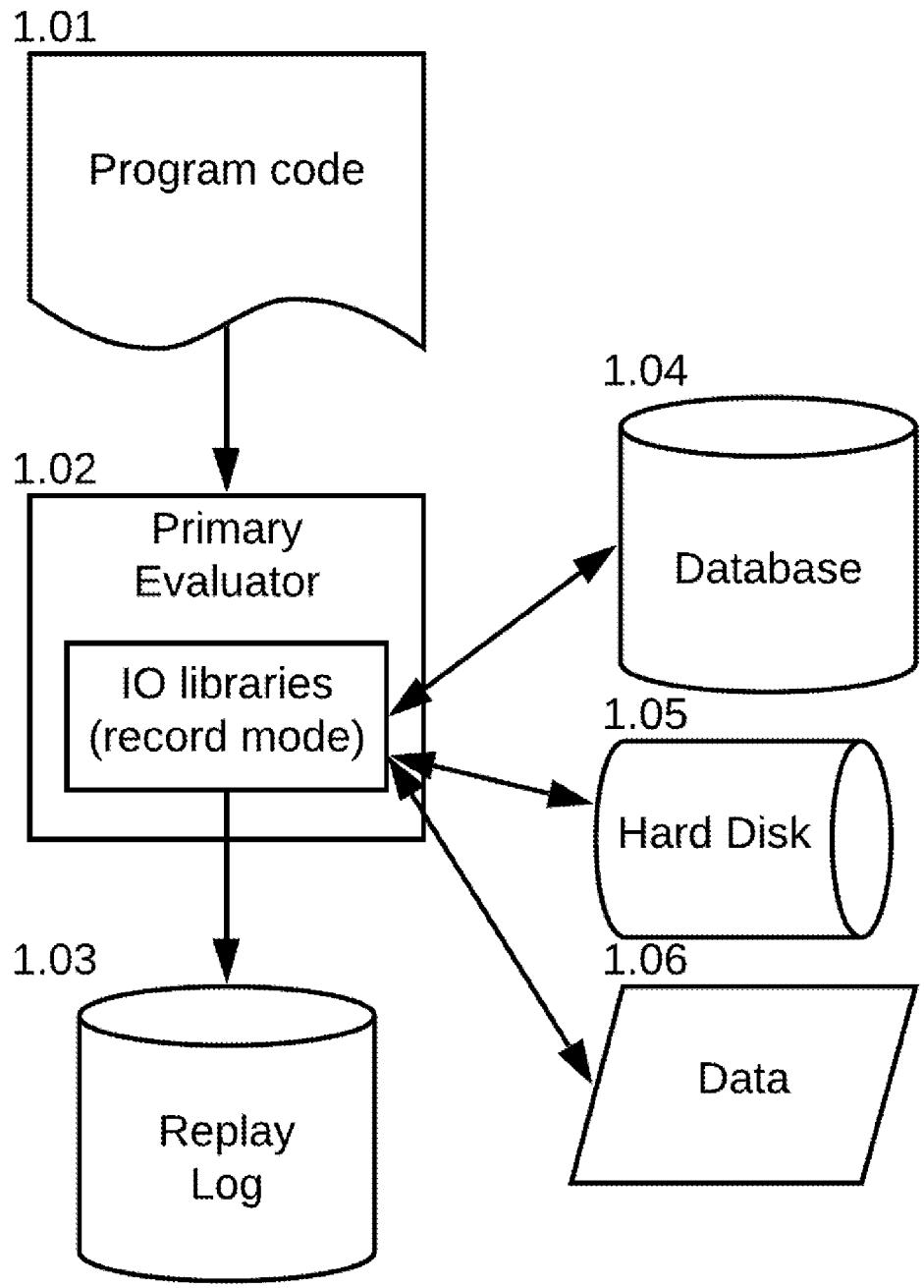
FIG. 1 shows a schematic diagram of a system having a replay log.

Embodiments of the claimed invention provide a technique which overcomes the current limitations of determining how a program arrives at a result, and enables much deeper and useful questions to be asked of program data.

Embodiments of the claimed invention require no programmer intervention, unlike event sourcing and logging. Provenance becomes a by-product of program execution. This frees the programmer to concentrate on business logic, not on program accounting and tracing functionality.

One of the ways that embodiments of the invention may be unique is that they attach provenance information to all values that are computed in a program. This provenance applies to not only outputs to a program but all intermediate values used to calculate the output.

This capability is fundamentally different and more powerful than the ability to just replay a program using a recorded set of inputs. Merely replaying a program from a recorded set of inputs does not allow a user to tractably drill back on a data-value to find its point of creation or modification, this capability is termed 'Value-level provenance'.

Value-level provenance is a novel concept that's described in this document. A running computer program at any point in time has a graph of reachable objects. As the program progresses, new objects are created, objects are modified and old unused objects are deleted.

In the context of this description, it will be appreciated that an object is a block of memory containing the fields of an entity.

Value level provenance is the ability to trace the provenance for any value, at any point in a programs execution, back through time.

As an example why this is useful, consider the following expression:

$$A=B/C$$

At runtime a divide by zero error may be triggered by the above expression. The provenance engine may determine that the values in play when the error was triggered were:

$$A=10/0$$

Critically the question now becomes, why was C assigned the value 0. To find the answer to that question, we need to know how C was created or updated to hold the value 0. This is value level provenance.

The objective is to provide a system which enables the following question to be asked and answered:

Given a value generated by a program execution, show how that value came into existence.

In the scope of a program execution, the answer to that question is twofold:
1. The exact location in the source code which directly created the value
2. The values of all the variables in scope in the source code, at the time and point of creation of the value The user may want to know the provenance of a value of a variable in scope which was used in the creation of the value. They should be able to select the value and drill-back again.

The capability allows a user to interactively explore why a program arrived at a given state. This capability is of critical utility for debugging programs.

When the user of the system debugs an application they will see the source code with the variables in the source code overlayed with the values of those variables at the current point in time for the debugger. Value-based provenance allows a user to select any variable in view and 'jump' to the source code and values at the time at which the value was created, modified or returned.

To enable true value based provenance there are four aspects detailed herein:
1. Step counter—A counter which increments as program instructions are executed
2. Creation Counters—Embedding of the current step counter at value creation in every program value
3. Update Counters—Embedding of the current step counter in all mutable program values at mutation time
4. Stack counters—A corresponding counter for every value on the program stack. This counter contains the current step counter for when the value was added to the stack Although these aspects may be applied individually, two or more of these aspects may be uniquely combined in a series of steps, which when applied together, allow improved value-based provenance.

The Replay Log

An example embodiment of a replay log is shown in FIG. 1.

The program execution for which provenance is required, may call non-deterministic functions. Examples include: getting the current time, reading from an external database or fetching data over the internet. These calls are identified and tagged, then the results of each call captured to a log for later replay.

In the context of this description, it will be appreciated that non-deterministic calls are calls which may return different results on subsequent invocations given the same input, for example: the current time, reading from an external database or many other types of calls.

The evaluator process for which provenance is required is called the 'primary evaluator'. In the context of this description, it will be appreciated that an evaluator is a program that evaluates another program and input data.

As an example the program code could call the function getCurrentSystemTime( ). This call returns an integer representing the current system time on the host computer. The 'getCurrentSystemTime' function would be identified as non-deterministic and flagged. When the primary evaluator made the 'getCurrentSystemTime' library call, the result would be both returned to the program, and logged to the replay log.

Decoupled Provenance Evaluator

Figure 2:
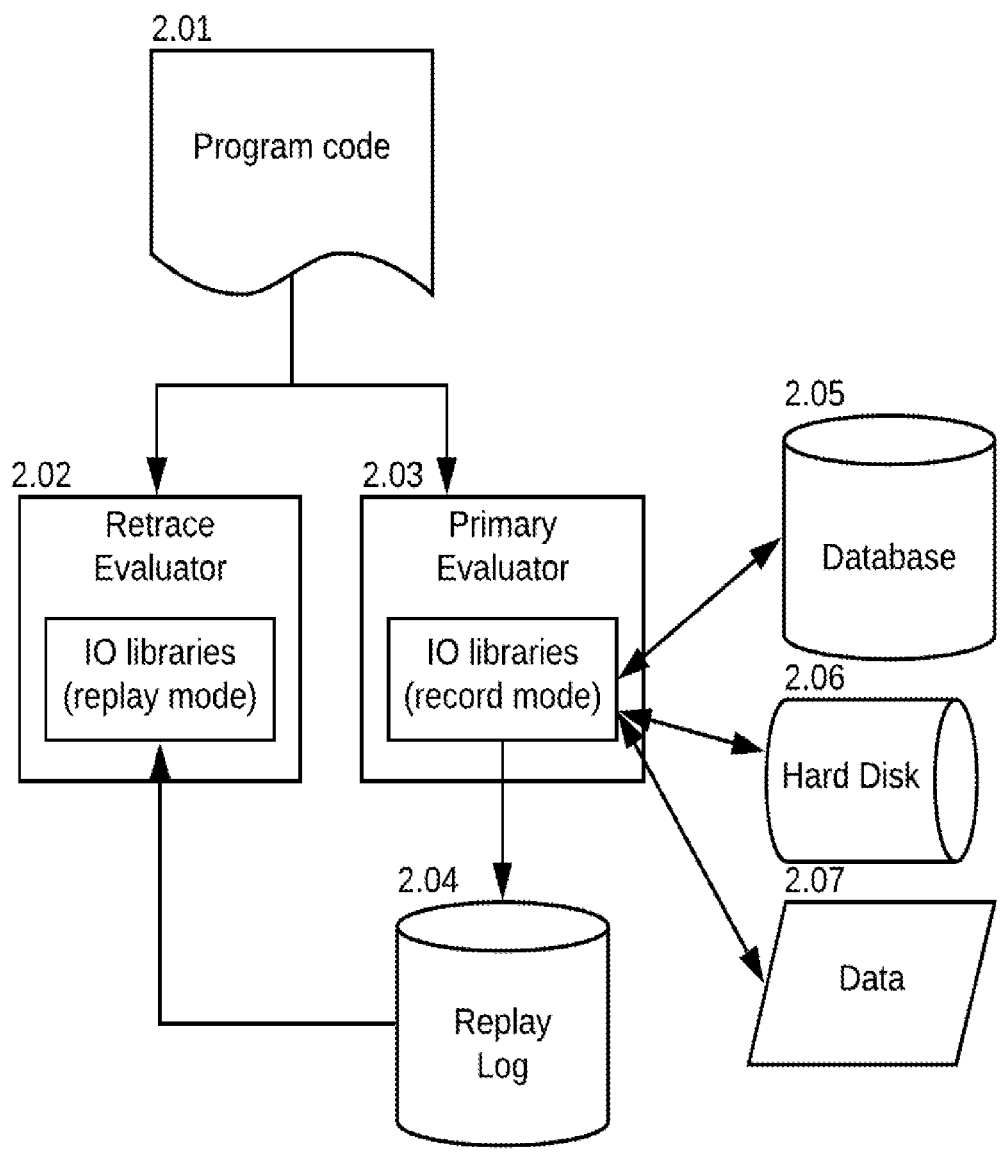
FIG. 2 shows a schematic diagram of a system having a decoupled provenance evaluator.

An example of a decoupled provenance evaluator is shown in FIG. 2.

A new component is added to the system called the 'Retrace Evaluator'. The retrace evaluator is the process which provides the actual provenance information.

The retrace evaluator is provided with the same program for execution as the primary evaluator.

The same non-deterministic functions that the primary evaluator has tagged are also tagged in the retrace evaluator.

When these functions are called in the retrace evaluator, the underlying call is not made, but the next value from the record log is returned.

As from the previous example, when the program code executes the 'getCurrentSystemTime' function, this function is identified as being 'non-deterministic', therefore the next item is read from the replay log, and supplied as a result to the program. The actual "getCurrentSystemTime' is not executed in the retrace evaluator.

Because the retrace evaluator consumes non-deterministic calls from the replay log, the retrace evaluator's execution is decoupled from the execution of the program evaluator.

The execution of the retrace evaluator may happen at an indeterminate period after the primary evaluator has executed a portion of code, or even on another computer.

The above approach of decoupling the Primary and Retrace evaluators may have various benefits:
1. Provenance operations can be isolated from execution of the Primary evaluator. If the Primary evaluator is running an important production program, the user would not want the production capability to be affected by users running provenance queries on historic data.
2. The Primary evaluator is not slowed down by the Retrace Evaluator. If the Retrace evaluator falls behind, it may catch up later.

3. Less machinery needs to be added to the Primary evaluator, thereby cutting operational risk for the business user.

Embedding Counters, the Step-Counter and Creation Counter

A naive way of providing value level provenance is to attach to every value in a program, the inputs and function used to generate that value. This approach is not tractable for a real world program because the memory required for evaluation would be prohibitive. The runtime system could never free unused memory because no memory would ever become unused as it would be required for provenance. This precludes execution of all but the most trivial programs.

Embodiments of the claimed invention use a novel and ingenious mechanism to overcome this limitation:

As previously stated, value-level provenance allows a user the capability to find out exactly how any value came into existence.

Firstly we consider a value which cannot change after creation, i.e. one which is 'immutable'. To ascertain the exact provenance of this value, the exact program state at the point of creation of the value needs to be recreated.

To be able to recreate a point of program execution, some mechanism to label a point in program execution is required. This label is called the 'step-counter'.

Figure 3:
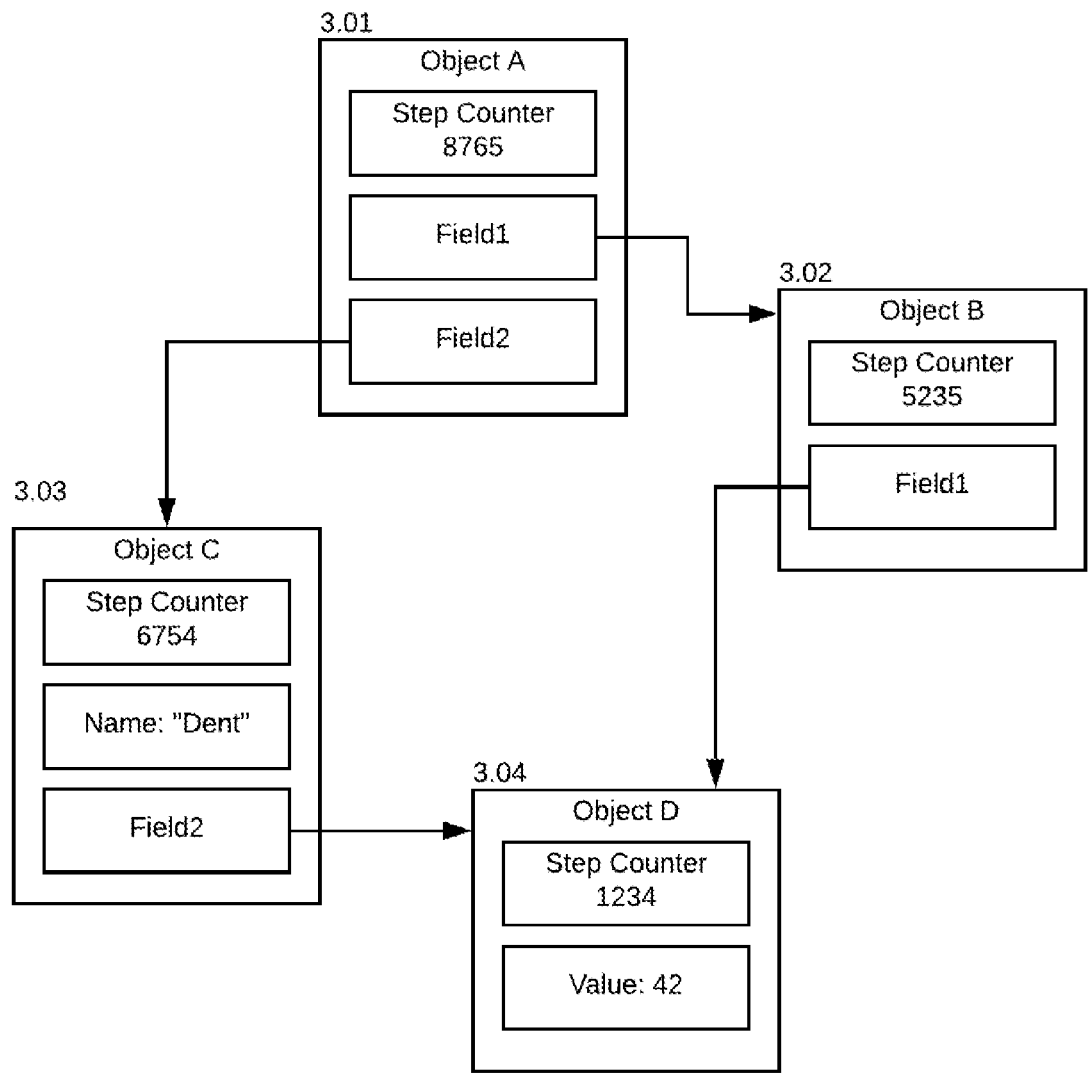
FIG. 3 shows a schematic diagram of a program objects including step counter values.

An exemplary embodiment showing the use of a step counter is shown in FIG. 3.

Each object in the system must have been created at a point in the program execution. Consequently there must be a unique 'step counter' for the point in the program execution at which a program value is created.

In the retrace evaluator we propose embedding the step counter for a value creation in every value of the program, so that every value in a program embeds the corresponding step counter of its creation. To trace back the provenance of a value, the step-counter is retrieved from the value and the program reset to the state denoted by the step-counter. In this state the user can see the values of the inputs and the code used to create the original value. Each of these values also has an embedded step-counter, and so the process can be repeated.

The step-counter which is embedded into a value at the value creation point is called the 'creation-counter'.

The retrace evaluator may maintain the step counter as an integer per thread of execution. The step counter increments on execution of the code. The step-counter may increment on each instruction execution or on a subset of the execution instructions. What is important is that the step counter has a granularity whereby provenance events can be uniquely identified. This may be object creation, object modification and/or function return.

There are two example implementation strategies by which the step-counter can be maintained in the running program:
1. Modify the evaluation loop in the retrace evaluator to increment the step counter on the correct subset of instructions
2. Apply a transformation to the instructions of the source program such that a global counter is incremented on the key operations in the source program Using either of these approaches, any point of program execution relating to provenance can now be uniquely determined by the step counter.

Update Counters

In the previous section, the provenance of immutable values was considered, and a technique detailed for ascertaining the provenance, using step-counters and creation-counters. We now expand on this technique for embodiments in which it is necessary to consider mutable values, that is values whose content may change after their creation. Examples of mutable values include collection types which allow change to the underlying collection, for instance a set type which allows addition and removal from the set. A collection type is a type of program object which contains other objects, examples include: lists, maps and sets.

To track the provenance of a mutable object, it is necessary to track how the object has changed through the program execution. This is accomplished with an additional field to every mutable object, namely the 'update-counter'. The update-counter on an object is set to the current step-counter at the point at which the object was modified in any way.

The step-counters represents program state before the execution of the step to which they refer. Consequently replaying to a given step-counter will not execute the operation to which the step counter refers, but refers to the program state, just prior to execution of the operation to which the step counter refers.

When a user recreates the program state denoted by an update-counter in an object, the program state may be replicated at the point just before the object was changed. As such the object in this state will contain the previous update counter, if there was no previous update, the update counter contains the same value as the creation counter.

In this manner, the complete set of any changes to an object can be mechanically determined by working backwards through update-counters.

An exemplary embodiment showing the use of an update counter is shown in FIG. 4, which represents a sequence of operations on a set.

The first operation is the set creation at step counter 1001, the element A is added at step counter 1100, and element B at step counter 1200 and element C at step counter 1300. Lastly element B is removed at step counter 1400.

Suppose the retrace evaluator is at step counter 2000. The set contains elements 'A' and 'C'. A user of the system may want to know the point in the program at which 'A' was added to the set. To find this, the following procedure could be followed. The program state would be set to step-counter 1400. In this state the set would have an update-counter of 1300 and content 'A', 'B' and 'C'. The program state would then be set to step counter 1300. In this state the set would then have an update counter of 1200 and content of 'A', and 'B''. The program state would then be set to step counter 1200 and in this state the set content would be 'A'. The program state would then be set to step counter 1100 and in this state the set content would be empty, but the current step would be the addition of 'A'. The user would then see the exact point in the code that 'A' was added to set along with all the current values of the objects in the code at that point.

This process incurs a linear search back through time to find the provenance of an arbitrary value contained within a composite object, where a composite object is one which contains two or more references to other objects.

Insertion Counters

Figure 5:
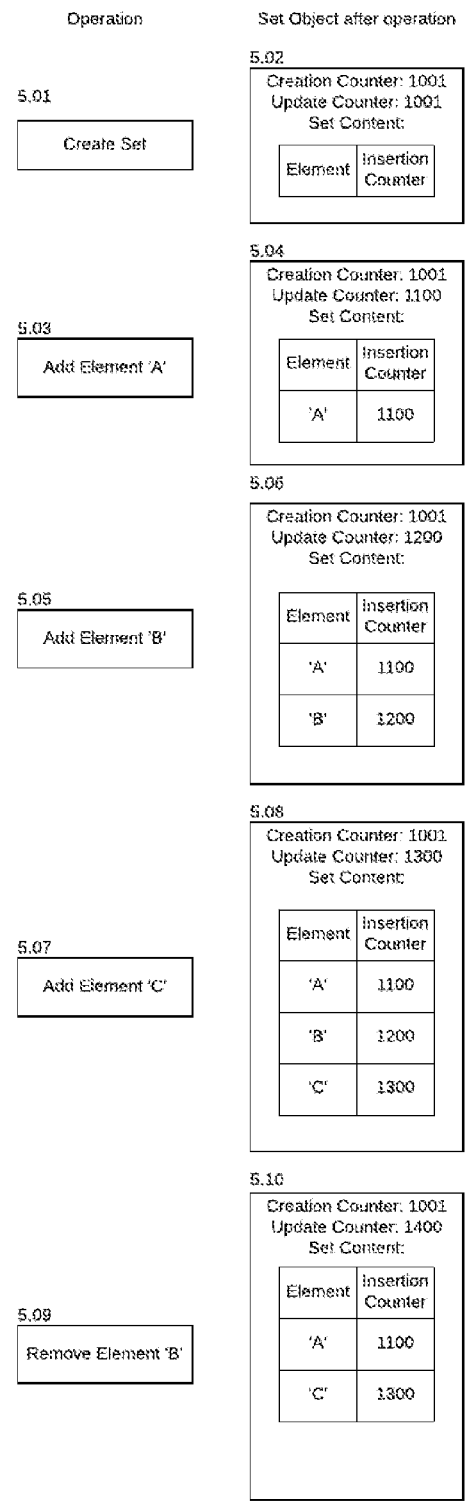
FIG. 5 shows a schematic diagram of how step counters can be used as an insertion counter when modifying a program object.

In order to cut the amount of computational effort required to find the provenance of objects contained in composite objects, the following optimization is suggested: Provide an Insertion counter per object reference in the composite object. An exemplary embodiment showing the use of an insertion counter is shown in FIG. 5.

The previous example is replicated but with an insertion counter per element of the set. It should be noted from FIG. 5 that the insertion counter of the last inserted element mirrors the update counter, apart from when element 'B' is removed. Also to be noted is that the insertion counter does not represent the update counter on the inserted object.

When insertion counters are used, the system can immediately jump to the step counter where an object was inserted to another object. This optimization can save considerable compute time and lead to enhanced interactivity for the user.

Insertion counters can be applied to any object which contains references to other objects which may change over time.

Snapshotting

Given the program code and a replay log, program execution can be replicated to any step counter by re-executing the retrace evaluator from the start with the replay log and the program code. The longer a program executes the longer it will take the replay program to re-create a state. An additional problem is that the storage requirements for the replay log may become prohibitive for a long running program performing many non-deterministic operations.

Figure 6:
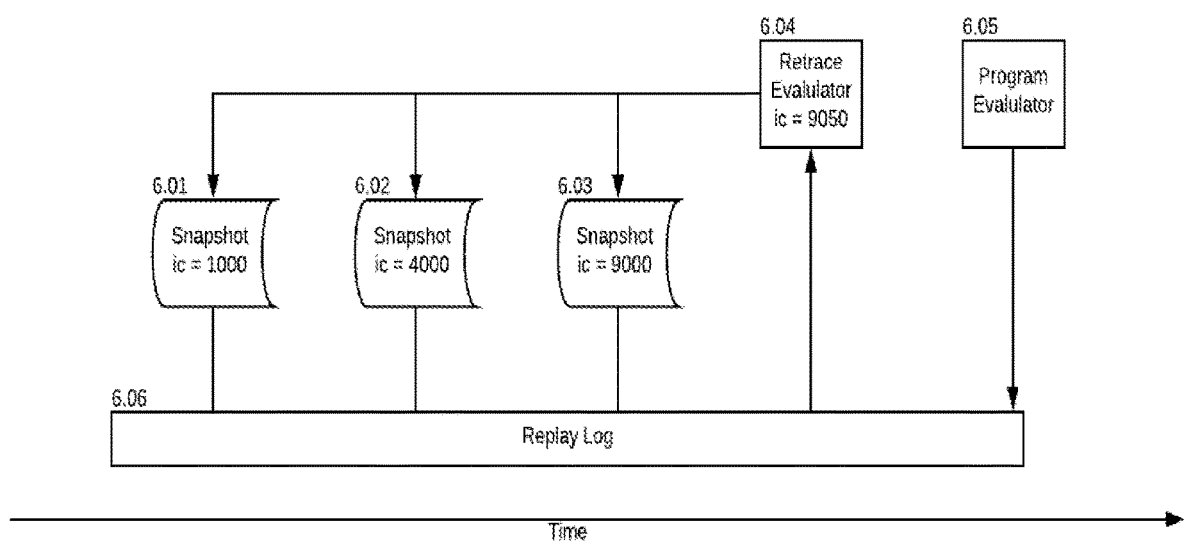
FIG. 6 shows a schematic diagram of generating one or more snapshots.

The solution to these problems is for the Retrace evaluator to periodically save out its state as the form of a snapshot along with the step counter value at the time of snapshot. An exemplary embodiment showing the use of a snapshotting technique is shown in FIG. 6.

The snapshot is the complete serialized state of the Retrace evaluator. This can be thought of as the Retrace evaluator being 'frozen' mid execution, and this frozen image being transformed such that it can be written to storage. The reverse of this process, that is loading a frozen image from storage into the retrace evaluator and resuming execution is called 'deserializing'. By deserializing a snapshot and loading into memory, evaluation can resume exactly after the point of serialization.

In the context of this description, it will be appreciated that serialization is the process of taking a memory resident object (usually in the form of a directed graph) and transforming this for storage or transmission. Deserialization is the reverse of serialization, i.e. taking a linearized directed graph of objects and instantiating as a connected graph in computer memory.

Any state given an instruction counter can now be re-created by loading the preceding snapshot into a new retrace evaluator and resume execution against the corresponding point in the replay log. Execution is continued until the required instruction counter.

Additionally data in the replay log can be deleted before the first snapshot for which provenance is required. By selectively deleting snapshots, performance of state creation can be traded against storage cost.

Stack Provenance

When a program executes a function, a new stack frame is created. A stack frame holds the parameters passed to the function and any local variables used by the function. In an object orientated language the stack frame may also hold a reference to the current object. If the called function executes another function, a new stack frame is created which references the calling stack frame. Some languages like C use one contiguous stack where each stack frame is a region of the contiguous stack, but the technique described here still holds.

In the context of this description, it will be appreciated that a stack is a contiguous block of memory or linked set of stack frames holding the variables of a set of nested function calls, and a stack frame is a portion of the stack, or object corresponding to a function call.

A step counter represents a point in the program execution. At a point in a program's execution will be a series of linked stack frames. Each stack frame corresponds to a nested function invocation. A variable location in a stack frame is named a stack-frame slot.

The systems and methods of embodiments of the invention allow the user to examine the provenance of all objects in the system at any given step counter. With creation counters, update counters and insertions counters the provenance of all objects in the system can be determined, but one question may remain in some embodiments, namely what is the provenance of the stack frames themselves.

For an object to be on the stack frame it must have either been:
1. Passed as a parameter to the calling function
2. Retrieved from another object on the current stack frame
3. Returned as the result of a function call
4. A literal in the program source code, where a literal is some value in the code, e.g.: the number 1000 or the string 'hello'

For scenario 1, the provenance can be found by tracing back to the linked calling stack frame. To cover scenario 2 and 3, a modification to the retrace evaluator is made: every stack frame slot has a corresponding step counter.

For scenario 2—the corresponding step counter would be the operation retrieving the attribute from the other object.

For scenario 3 the provenance for the stack-frame slot is where the called function returned result. For example, consider the following pseudocode:

```
function a( ) :
    return 1
function b( ) :
    c = a( )
    return c + 2
```

Now if we invoke function b:
print(b ( ))

One could reasonably expect: 3 to be printed to the terminal. In function 'b', 'c' is a variable and will have its own stack frame slot which is assigned to the result of 'a( )' when 'a' is executed. Stack frame slot 'c' will also have a corresponding step counter. This step counter is set to the point at which execution of function 'a' returns value 1.

Consider the case of nested function calls:

```
function d( ) :
    return 1
function a( ) :
    return d( )
function b( ) :
    c = a( )
    return c + 2
```

Now as before function 'b' is invoked:
print(b ( ))

One could reasonably expect: 3 to be printed to the terminal. But there is a question as to what step counter would be stored against stack frame slot 'c' now. The answer is where the invocation of function 'd' returns 1, as this is where the actual value being stored against stack frame slot 'c' originated.

As the user of the system loads a stack frame for examination, the exact provenance of how any value came to reside on the stack frame is now available. Note this is a different concept from how the value itself came into existence.

For example, consider where a function may return predefined values. In many systems the boolean values: 'true' and 'false' are predefined. When a function executes and returns a boolean, it is often not of much interest how the values 'true' and 'false' were created, but why the function in question returned either 'true' or 'false' value. Stack provenance answers this question.

There are two ways a the step-counters for the stack-slots could be maintained by the retrace evaluator:
1. The source instructions may be modified such that a parallel stack frame of step-counters is maintained by the executing code
2. The retrace evaluator itself may be modified such that a parallel stack frame of step-counters are maintained.

This covers the two cases that a value may come into scope on an execution frame. Either the value is assigned into an existing object, in which case the update counter will reflect that, or it is returned from a function, in which case the parallel stack will capture that return.

A user may want to ascertain the provenance on the result generated by a program. The program may run and produce one result, or it may produce many results during its execution, sometimes in response to user generated requests. To enable the user to generate the provenance on a result from a program, there must be a way of identifying the result coming from the primary evaluator and correlating that to the same result being generated from the retrace evaluator.

Certain functions' will be tagged as result generating. When the source program calls these functions a result is generated somewhere. This could be an output to a terminal, a write to a database row or a write to file.

The result is given to the provenance system which consults its database of hashes against step-counters.

Given a known step counter the following diagram shows how a user loads the provenance for that step counter.

Figure 7:
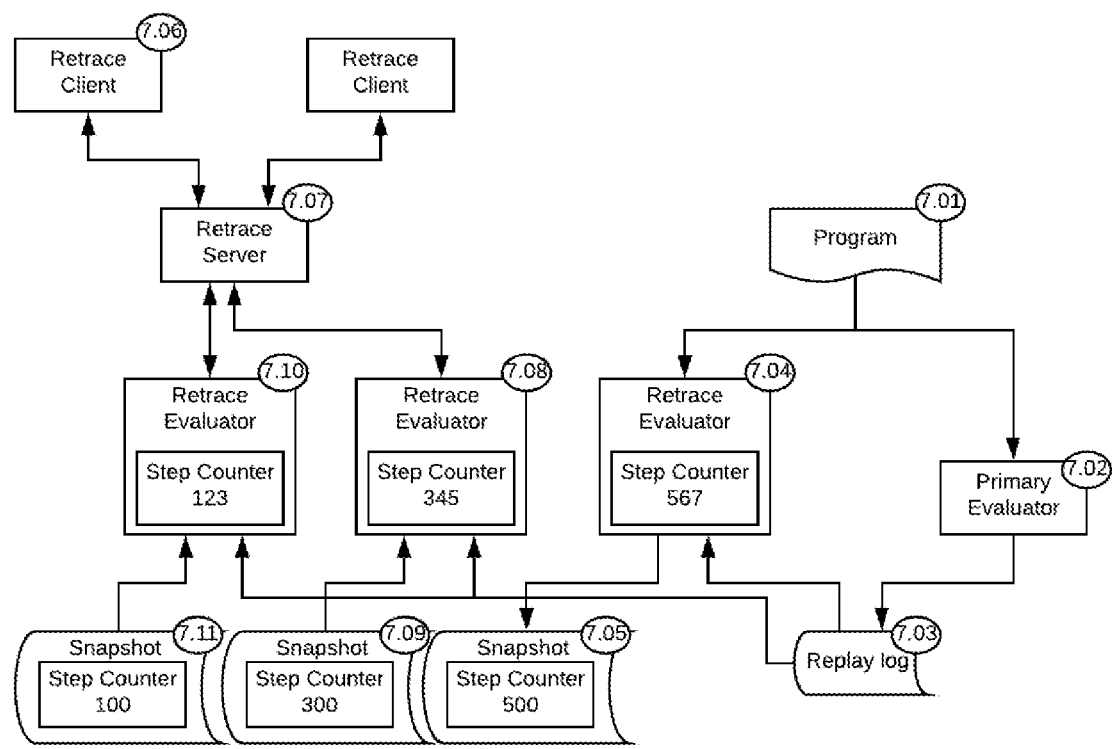
FIG. 7 shows a schematic diagram of an end-to-end process.

An exemplary end-to-end workflow is shown in FIG. 7.

In a first step, the program is loaded by the Primary and Retrace evaluator for execution (7.02 and 7.04).

In a second step, the primary evaluator executes the program while logging the results of all non-deterministic calls to the Replay log (7.03).

In a third step, the Replay log appends all new items to the log file. Very old items predating the oldest retained snapshot may be deleted.

In a fourth step, the retrace evaluator runs in catch-up mode reading results of all flagged non-deterministic calls from the replay log. It also creates the counters (e.g. creation, update, stack) on all objects. Lastly it periodically writes out its state to a series of snapshot files, described in step (7.05).

In a fifth step, a series of snapshot objects are periodically created by the Retrace evaluator (detailed in step 7.04) containing the exact state of the retrace evaluator at a point in time. Intermediate snapshot files created after the oldest snapshot may be deleted to free space. In the diagram, the snapshot with Step Counter 100 is the oldest, this means that the Snapshots with step counters of 300 and 500 may be deleted with no loss of information. The tradeoff is that recreating a state for provenance may take longer.

In a sixth step, a user loads the retrace client, which connects to the Retrace server (7.07), The user enters a step counter representing a program state. As an example the user may enter Step Counter 345.

In a seventh step, the retrace server selects the nearest preceding snapshot (7.09), and then starts a retrace evaluator (7.08) against this snapshot.

In an eighth step, the retrace evaluator loads its state against snapshot, that is Snapshot with Step counter of 300 (7.09) and proceeds to execute to the given step counter loading the results of any non-deterministic calls from the replay log (7.03). When the retrace evaluator has replicated the desired state, a subset of data representing the state is returned to the Retrace server (7.07). The retrace server formats the data and sends it back to the client (7.06).

In a ninth step, the end user may decide to drill back on the provenance of an object in the returned data. For example, the user is interested in an object which was created at step counter 123. In this case the client (7.06) sends a load request for step counter 123 to the server (7.07). The nearest preceding snapshot would be the snapshot created at Step Counter 100 (7.11). The Retrace Server starts a Retrace Evaluator from the snapshot and gives instruction to execute to Step Counter 123. The process repeats.

The above detailed description of embodiments of the invention are not intended to be exhaustive or to limit the invention to the precise form disclosed. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure.

The invention claimed is:

1. A computer implemented method, the method comprising the steps of:
   embedding a first index reference value to each program object created in progress of a program during its execution, each of the first index reference values functioning as a step counter and each program object representing a block of memory containing fields of an entity, wherein each of the first index reference values is associated with a point in the progress of the program execution at which the corresponding program object was created;
   generating a first program snapshot by storing a sterilized state of the program objects embedded with the first index reference values;
   subsequently recreating a state of the program by:
      receiving an indication of a second of the index reference value, the second index reference value being embedded within a selected program object and associated with a point in progress of execution of the program;
      recreating the state of the program according to the sterilized state of the program, with the first index reference value being associated with a point in the progress of the program execution that precedes the point in the progress of the program execution associated with the second index reference value; and executing the program from the recreated state of the program to the point in the progress of the program execution associated with the second index reference value, including using previously stored non-deterministic values determined by a first evaluator program that evaluates the program during a first execution of the program and determines and stores non-deterministic values, to thereby determine the provenance of the selected program object.

2. The method of claim 1 further comprising the step of, for program values computed or used by the program during a first execution of the program, assigning the index reference value associated with the point in the progress of the program execution at which the value was created as a first counter.

3. The method of claim 1 further comprising the step of, for program values computed or used by the program during a first execution of the program, assigning the index reference value associated with the point in the progress of the program execution at which the value was modified as a second counter.

4. The method of claim 1 further comprising the step of, for program values computed or used by the program during a first execution of the program, assigning the index reference value associated with the point in the progress of the program execution at which the value was inserted into a program object as a third counter.

5. The method of claim 1 wherein one or more stack frames are generated by the program during execution, the method further comprising the step of, for each program stack frame generated by the program during execution, assigning the index reference value associated with the point in the progress of the program execution at which a value is assigned to the program stack frame.

6. The method of claim 1 further comprising generating further program snapshots by storing the set of program values associated with further index reference values.

7. The method of claim 1 further comprising the step of, once the first program snapshot is generated, deleting the stored non-deterministic values required to recreate the state of the program to the point in the progress of the program execution corresponding to the first program snapshot.

8. The method of claim 1 wherein the method is performed by one or more first evaluator programs and wherein the evaluator program that evaluates the program during the first execution and determines and stores non-deterministic values is executed independently of the one or more first evaluator programs.

9. The method of claim 1 wherein the second evaluator program logs each non-deterministic value that is computed or used by each non-deterministic call made by the program during execution.

10. The method of claim 1 wherein a plurality of program operations are each associated with the same index reference value.

11. The method of claim 1 wherein the program values are associated with program objects.

12. A system comprising a computer configured to carry out the method of claim 1.

13. A non-transitory computer-readable storage medium comprising instructions that, when executed by one or more processors of a computing device, cause said one or more processors to:

embedding a first index reference value to each program object created in progress of a program during its execution, each of the first index reference values functioning as a step counter and each program object representing a block of memory containing fields of an entity, wherein each of the first index reference values is associated with a point in the progress of the program execution at which the corresponding program object was created;

generating a first program snapshot by storing a sterilized state of the program objects embedded with the first index reference values;

subsequently recreating a state of the program by:

receiving an indication of a second of the index reference value, the second index reference value being embedded within a selected program object and associated with a point in progress of execution of the program;

recreating the state of the program according to the sterilized state of the program, with the first index reference value being associated with a point in the progress of the program execution that precedes the point in the progress of the program execution associated with the second index reference value; and executing the program from the recreated state of the program to the point in the progress of the program execution associated with the second index reference value, including using previously stored non-deterministic values determined by a first evaluator program that evaluates the program during a first execution of the program and determines and stores non-deterministic values, to thereby determine the provenance of the selected program object.

* * * * *